United States Patent [19]

Morimoto

[11] Patent Number: 4,761,153

[45] Date of Patent: * Aug. 2, 1988

[54] TRANSMISSION RATIO CONTROL SYSTEM FOR A CONTINUOUSLY VARIABLE TRANSMISSION

[75] Inventor: Yoshihiko Morimoto, Mitaka, Japan

[73] Assignee: Fuji Jukogyo Kabushiki Kaisha, Tokyo, Japan

[*] Notice: The portion of the term of this patent subsequent to Jun. 16, 2004 has been disclaimed.

[21] Appl. No.: 27,746

[22] Filed: Mar. 19, 1987

[30] Foreign Application Priority Data

Mar. 25, 1986 [JP] Japan ................ 61-066830

[51] Int. Cl.$^4$ ............................................. F16H 11/02
[52] U.S. Cl. ........................................ 474/28; 74/867
[58] Field of Search .................... 474/28, 18; 74/865–869; 364/424.1

[56] References Cited

U.S. PATENT DOCUMENTS 4,672,864 6/1987 Morimoto .................. 474/28 X

FOREIGN PATENT DOCUMENTS 205257 5/1986 European Pat. Off. .

Primary Examiner—Stephen J. Novosad
Assistant Examiner—Thuy M. Bui
Attorney, Agent, or Firm—Martin A. Farber

[57] ABSTRACT

A control system has a transmission ratio control valve having a spool for controlling oil supplied to a cylinder of a drive pulley to change the transmission ratio. The transmission ratio control valve has chambers at both ends of the spool. By controlling the amount of oil supplied to the chambers in accordance with the difference between desired transmission ratio and actual transmission ratio, the spool is shifted, so that the transmission ratio changing speed is controlled. The desired transmission ratio is determined by a desired speed of input of the transmission.

4 Claims, 6 Drawing Sheets

FIG. 5a
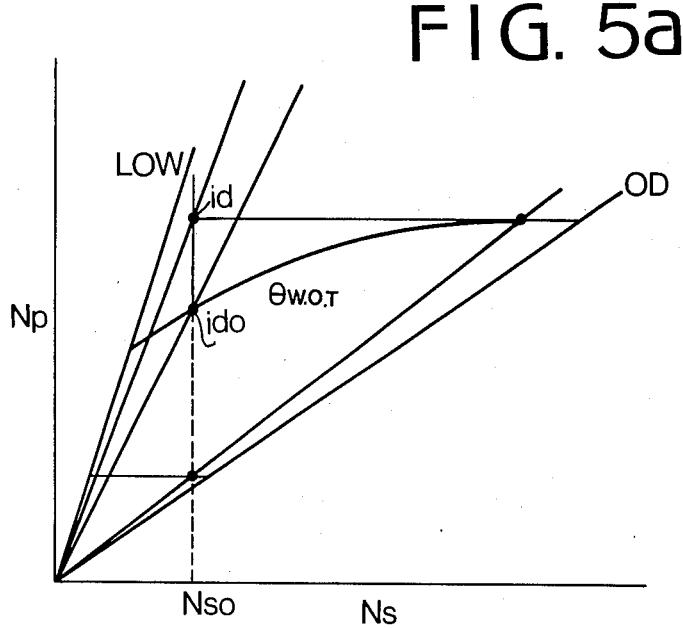
FIG. 5b
FIG. 5c
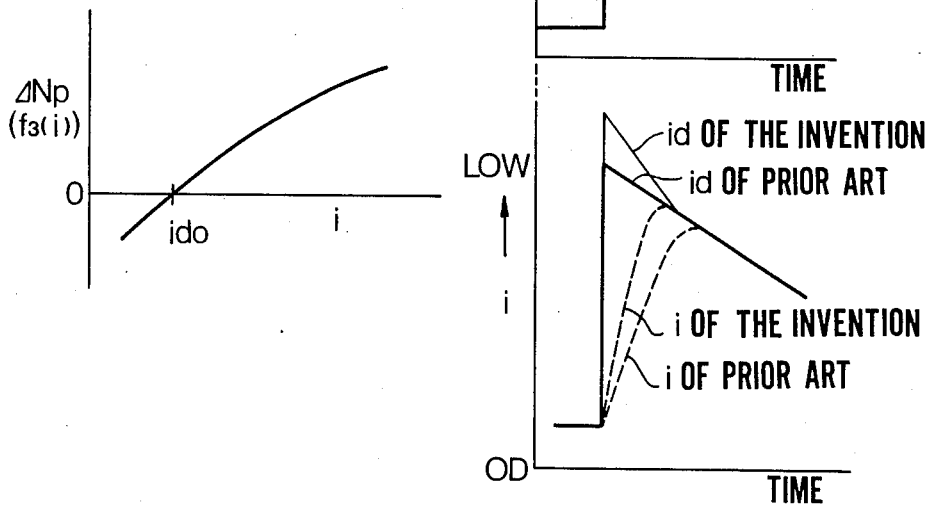

TRANSMISSION RATIO CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the transmission ratio at a minimum transmission ratio.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump for supplying oil to the servo devices, a line pressure control valve and a transmission ratio control valve. Each valve comprises a spool to control the oil supplied to the servo devices.

The transmission ratio control valve operates to determine the transmission ratio in accordance with the opening degree of a throttle valve of an engine and the speed of the engine. The line pressure control valve is adapted to control the line pressure in accordance with the transmission ratio and the engine speed. The line pressure is controlled to prevent the belt from slipping on the pulleys in order to transmit the output of the engine.

When start of the vehicle, the transmission ratio is set at a maximum value. When the vehicle speed and engine speed reach set values under a driving condition, the transmission ratio starts to change (to upshift). The transmission ratio is automatically and continuously reduced at a speed which is determined by line pressure, the pressure of oil supplied to the servo device of the drive pulley, and the actual transmission ratio. In such a system, the speed of changing of the transmission ratio up to a desired transmission ratio can not be controlled in accordance with driving conditions.

Accordingly, hunting or overshooting of the transmission ratio occurs, which reduces the driveability of the vehicle.

European Patent Application No. 205257 discloses a transmission ratio control system in which the desired transmission ratio for obtaining a transmission ratio changing speed is derived from a look-up table having an X-axis for opening degree ($\theta$) of a throttle valve of an engine and a Y-axis for vehicle speed represented by driven pulley speed ($N_S$). Such a table has a very large capacity because the vehicle speed must be divided into a large number of grades. In addition, the table does not provide data for operation at transient states of the transmission, such as the kickdown, because the opening degree ($\theta$) is at an extreme value in the transient state.

SUMMARY OF THE INVENTION

The object of the present invention is to provide a system for a continuously variable transmission, which can control the transmission ratio with a table having a small capacity.

In the system of the present invention, the table is made of data with respect to the actual transmission ratio and load on an engine.

According to the invention, there is provided a control system for a continuously variable transmission for transmitting the power of an internal combustion engine to driving wheels of a motor vehicle, having a drive pulley including a hydraulically shiftable disc and a first hydraulic cylinder for shifting the disc, a driven pulley including a hydraulically shiftable disc and a second hydraulic cylinder for operating the disc, a belt engaged with both pulleys, a transmission ratio control valve having ports and a spool, a first hydraulic circuit having a pump for supplying oil to the second cylinder, and to the first cylinder through the transmission ratio control valve.

The system comprises first detecting means for producing a first speed signal representing input speed of the transmission, second detecting means for producing a second speed signal representing output speed of the transmission, third detecting means for detecting load on the engine and for producing a load signal, first means responsive to the load signal and to the actual transmission ratio signal for producing a desired input speed signal, third means responsive to the load signal and to the desired input speed signal for producing a desired transmission ratio signal, and fourth means responsive to the desired transmission ratio signal for shifting the spool of the transmission ratio control valve so as to provide a transmission ratio.

The other objects and features of this invention will become understood from the following description with reference to the accompanying drawings.

BRIEF DESCRIPTION OF DRAWINGS

FIGS. 5a to 5c are graphs showing operations of the system.

DETAILED DESCRIPTION OF THE PREFERRED EMBODIMENT

Figure 1:
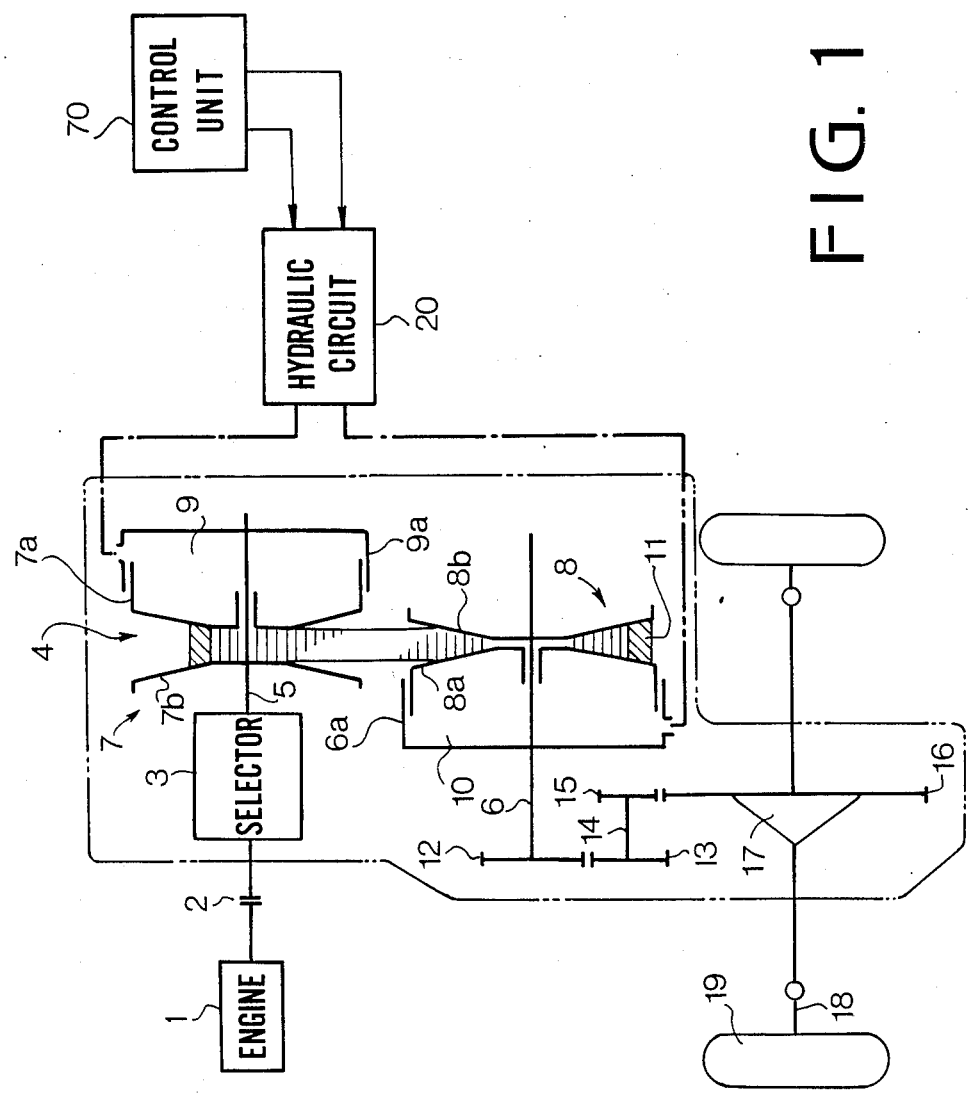
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on the shafts 5 and 6 respectively. A fixed conical disc 7b of the drive pulley 7 is integral with the main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2A:
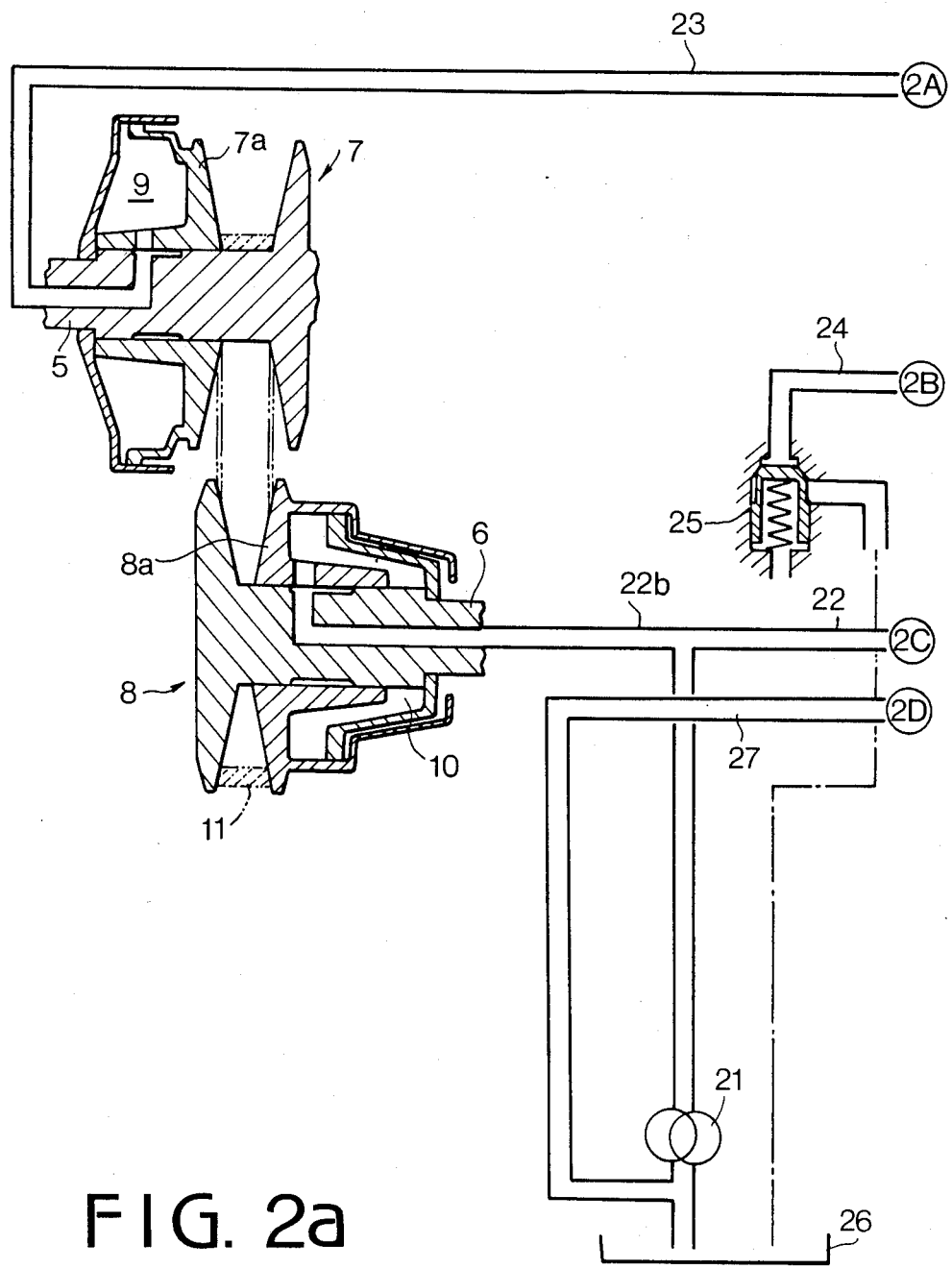
FIGS. 2a and 2b are schematic diagrams showing a control system according to the present invention.
Figure 2B:
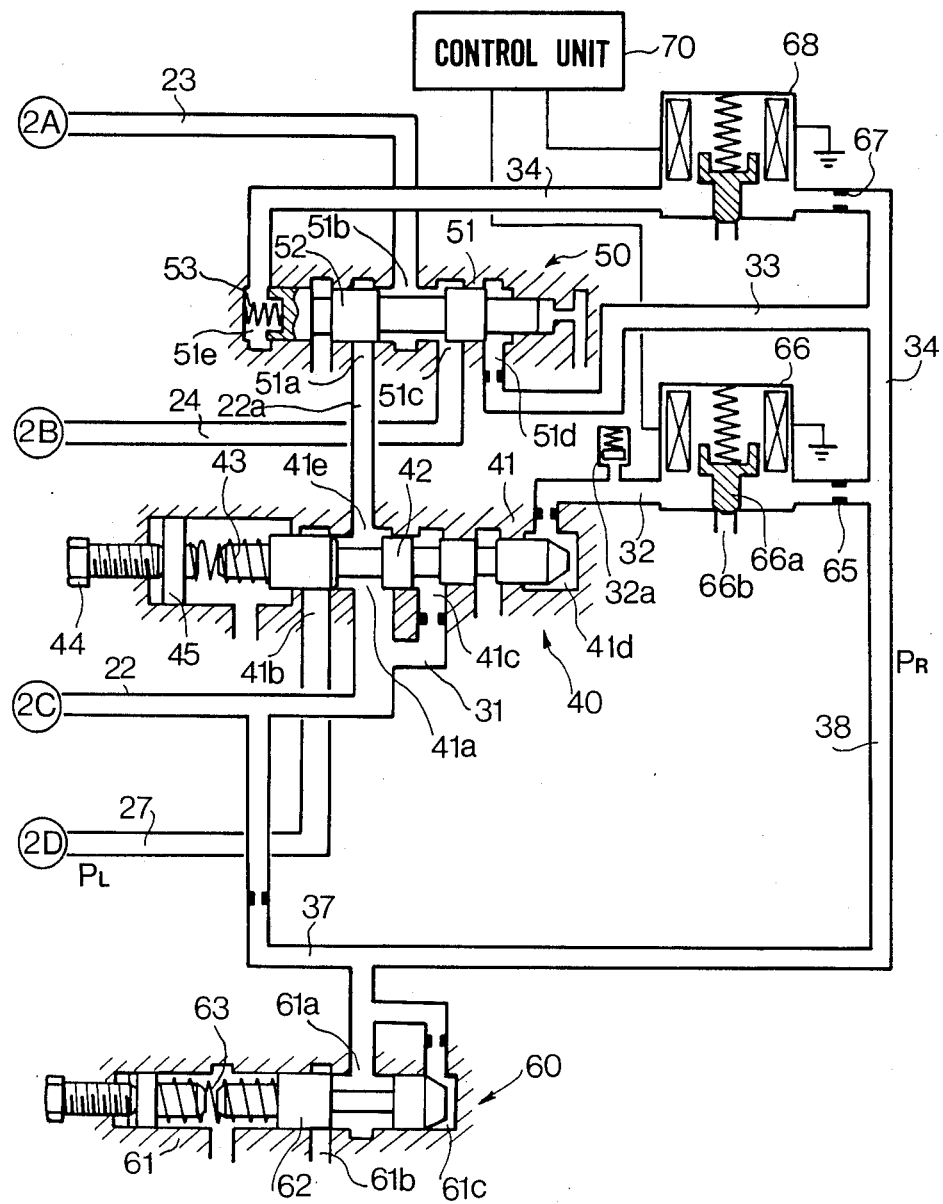

Referring to FIGS. 2a and 2b, the chamber 9 of the drive pulley 7 is supplied with pressurized oil by an oil pump 21 from an oil reservoir 26 passing through a line pressure conduit 22, ports 41a and 41e of a line pressure control valve 40, a transmission ratio control valve 50, and a conduit 23. The chamber 10 of the driven pulley 8 is applied with pressurized oil through the a passage 22b without passing through the valves 40 and 50. The movable conical disc 7a of the drive pulley 7 is so designed that the pressure receiving area thereof is larger than that of the movable conicl disc 8a of the driven pulley 8. The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45, the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, and a spring 53 for urging the spool 52 in the downshift direction. A port 51b of the valve body 51 is selectively communicated with a pressure oil supply port 51a or a drain port 51c in accordance with the position of lands of the spool 52. The port 51b communicates with the chamber 9 through conduit 23, and the port 51a communicates with port 41e of the line pressure control valve 40 through conduit 22a. The drain port 51c is communicated with the oil reservoir 26 through a conduit 24 and a check valve 25.

The system is provided with a regulator valve 60, and solenoid operated on-off valves 66 and 68.

The regulator valve 60 comprises a valve body 61, an inlet port 61a connected to the pump 21 through passages 37 and 22, a spool 62, an end chamber 61c connected to the passage 37, and a spring 63 urging the spool 62 to the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through an orifice 67, solenoid operated on-off valve 68 and passage 34. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The valves 66 and 68 are operated by signals from a control unit 70. Thus, pressure controlled by the valves 66 and 68 is applied to the chambers 41d and 51e.

In the transmission ratio control valve 50, the pressure receiving area of the spool 52 at chamber 51e is set to a value larger than the area at the chamber 51d. On the other hand, the control pressure in the chamber 51e can be changed between a maximum value which is the same as the constant pressure in the chamber 51d, when the duty ratio is 0%, and zero by controlling the duty ratio of the pulses for operating the valve 68. The transmission ratio control valve 50 is so arranged that the spool 51 is at a neutral position at a middle duty ratio (for example 50%) and is located in an oil supply position by increasing the duty ratio from the middle duty ratio because of the reduction of the control pressure in the chamber 51e. Further, the speed of the movement of the spool 52 changes with the magnitude of changing of the duty ratio. The spool 52 is shifted to an oil drain position by decreasing the duty ratio. It will be understood that when the oil is supplied to the chamber 9, the transmission is upshifted.

The relationship between the duty ratio of the pulses applied to the solenoid operated control valve 68 and the transmission ratio is explained hereinafter.

The necesssary volume V of oil in the chamber 9 is a function of the transmission ratio i, namely:

$$V = f(i)$$

The flow rate Q is obtained by differentiating the volume V with respect to time and expressed as $$Q = dV/dt = df(i)/di \cdot di/dt$$
$$di/dt = f(Q,i)$$

The supply flow rate $Q_s$ and drain flow rate $Q_d$ are presented as $$Q_d = C \cdot S_d \sqrt{(2gP_p)/\gamma}$$
$$= a \cdot S_d \sqrt{P_p}$$
$$Q_s = a \cdot S_s \sqrt{P1 - P_p}$$
$$a = c \sqrt{2g/\gamma}$$

where
$P_p$ is the pressure in chamber 9,
P1 is the line pressure,
C is the coefficient for the flow rate,
g is the acceleration of gravity,
$\gamma$ is the specific gravity of oil,
$S_s$ is the opening area of the supply port 51a, and
$S_d$ is the opening area of the drain port 51c.

Designating D as the duty ratio of pulses applied to the control valve, that is the ratio of ON/OFF of the valve, the average flow rate Q in one cycle (oil supply state is positive) is $$Q = a(D \cdot S_s \sqrt{P1 - P_p} - (1-D) \cdot S_d \sqrt{P_p}$$

Assuming a, $S_s$ and $S_d$ to be constants, $$Q = f(D, P1, P_p)$$

The line pressure P1 is determined by the transmission ratio i and engine torque, and the pressure $P_p$ in the chamber 9 is determined by the transmission ratio i and the line pressure P1. Accordingly, assuming the engine torque to be constant, $$Q = f(D, i)$$

Since $$di/dt = f(Q, i)$$

therefore $$D = f(di/dt, i)$$

Accordingly, the duty ratio is determined by the transmission ratio changing speed di/dt and the transmission ratio i. In a feedback control system, the transmission ratio changing speed di/dt can be determined by the difference between the actual transmission ratio i and a desired transmission ratio id, as follows.

$$di/dt = K1 \,(id - i)$$

where K1 is a coefficient.

Further, if the transmission ratio changing speed di/dt is determined, the duty ratio D can be obtained from the speed. When the actual transmission ratio i is larger than the desired transmission ratio id (i>id), the value of di/dt is negative. In such a state, the duty ratio D is increased to reduce the pressure in the chamber 51e so as to upshift the transmission. The downshifting is performed in the reverse manner.

However, the response of the transmission control system including various mechanisms is slow, which means that the conversion of the actual transmission ratio to the desired transmission ratio is delayed.

In order to eliminate the control delay, the transmission ratio changing speed di/dt is corrected by the speed of change of the desired transmission ratio (did/dt), as follows.

$$di/dt = K1 \,(id - i) + K2 \cdot did/dt$$

where K2 is a coefficient.

The desired transmission ratio changing speed did/dt is to advance the phase of the control operation. Thus, the response of the system can be improved. The speed did/dt is obtained by the mount ($\Delta$id) of change of the desired transmission ratio at a predetermined intervals ($\Delta$t), that is $\Delta$id/$\Delta$t.

The coefficient K1 may be changed in accordance with the opening degree of the throttle valve, and the coefficient K2 may also be changed in accordance with physical conditions of the system, such as viscosity of oil used in the system.

Figure 3:
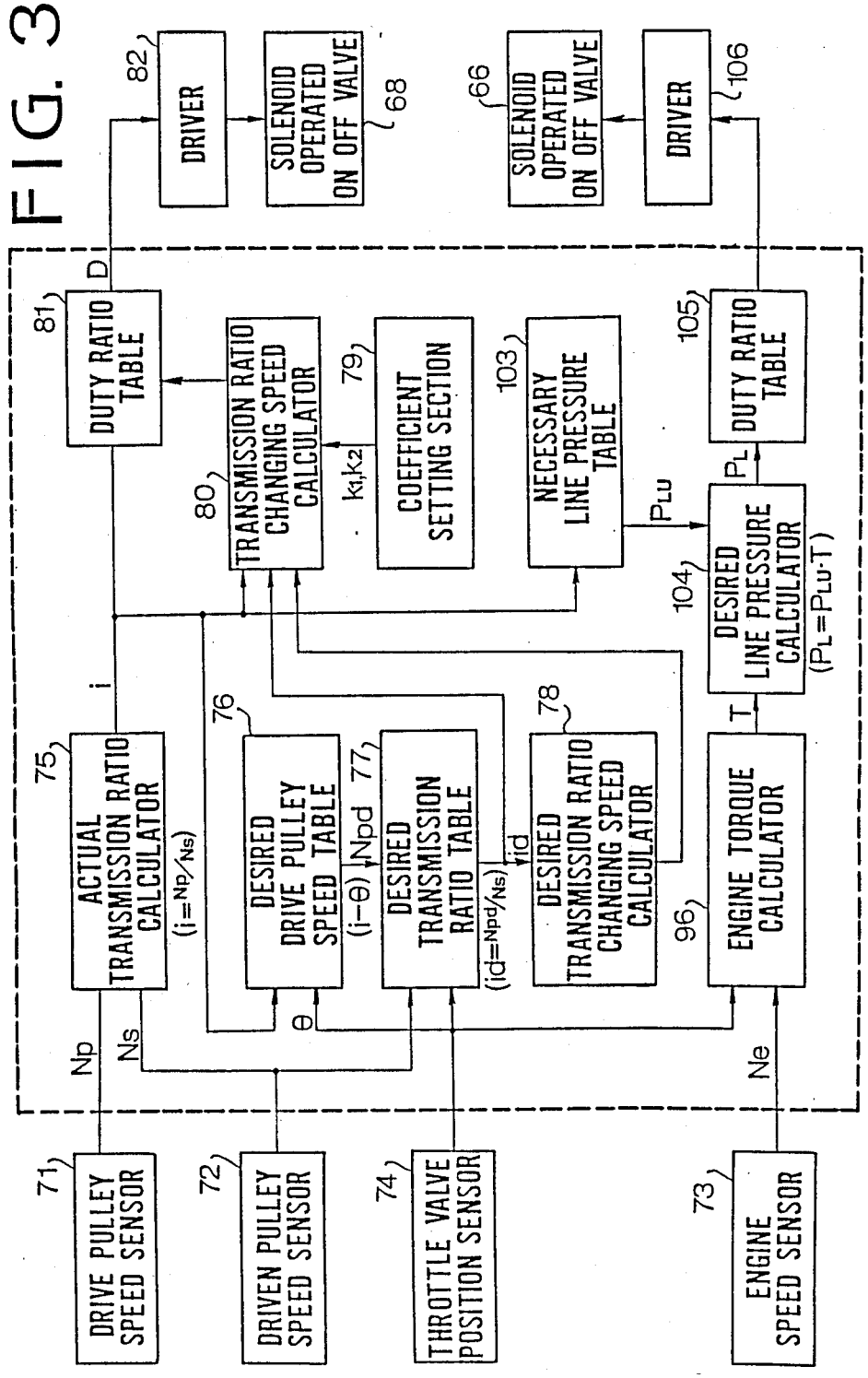
FIG. 3 is a block diagram showing a control unit.

Referring to FIG. 3, the system is arranged to control the transmission ratio in accordance with the above-described principle. In the system, a drive pulley speed sensor 71, driven pulley speed sensor 72, engine speed sensor 73 and throttle position sensor (or intake manifold pressure sensor) 74 are provided. Output signals $N_P$ and $N_S$ of sensors 71, 72 are fed to an actual transmission ratio calculator 75 to produce an actual transmission ratio i in accordance with $i = N_P/N_S$. The actual transmission ratio i and the output signal $\theta$ representing the opening degree of the throttle position sensor 74 are fed to a desired drive pulley speed table 76. The desired drive pulley speed $N_Pd$ is derived from the table 76 in accordance with the ratio i and signal $\theta$.

Figure 4A:
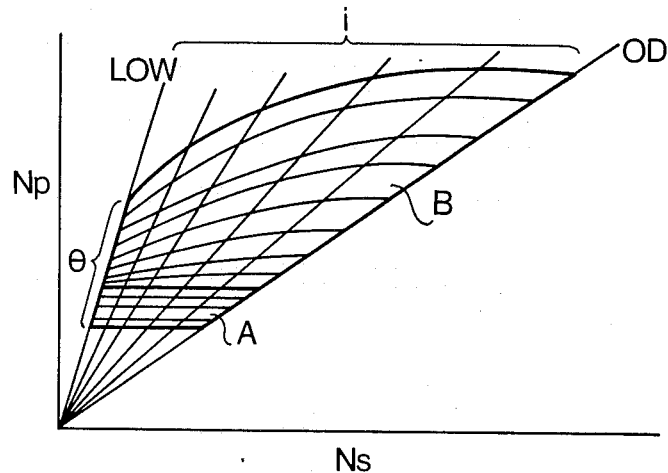
FIG. 4a is a graph showing a characteristic of a transmission.
Figure 4B:
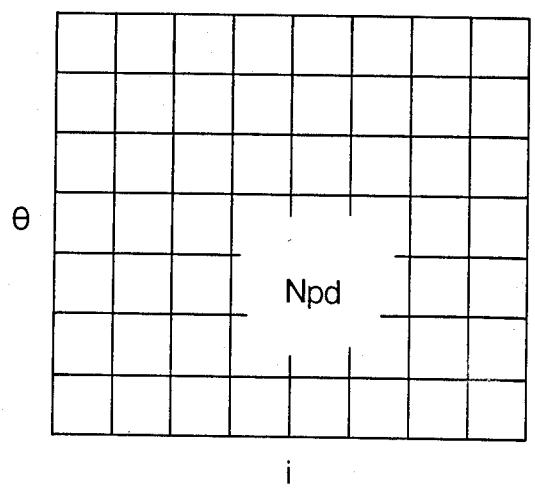
FIG. 4b shows a look-up table for desired drive pulley speed.

Referring to FIG. 4a, the transmission is so arranged that in a low engine speed range A, the driven pulley speed (vehicle speed) $N_S$ that is the transmission ratio changes at a constant drive pulley speed $N_P$. However, in a high engine speed range B, the transmission is upshifted with increase of the drive pulley speed (engine speed) $N_P$. FIG. 4b shows a look-up table for the desired drive pulley speed $N_Pd$. Although the actual transmission ratio changes in the range B as shown in FIG. 4a, the desired drive pulley speed $N_Pd$ is determined at a fixed value in accordance with the actual transmission ratio i and opening degree $\theta$, as shown in FIG. 4b.

The desired drive pulley speed $N_Pd$ and drive pulley speed $N_S$ are fed to a desired transmission ratio calculator 77 where the calculation of the desired transmission ratio (id), $id = N_Pd/N_S$ is made. The desired transmission ratio id is fed to a desired transmission ratio changing speed calculator 78 which produces a desired transmission ratio changing speed did/dt. A coefficient setting section 79 produces coefficients K1 and K2. The actual transmission ratio i, desired transmission ratio id, desired transmission ratio changing speed did/dt and coefficients K1 and K2 are applied a transmission ratio changing speed calculator 80 to produce a transmission ratio changing speed di/dt from the formula $di/dt = K1(id - i) + K2 \cdot did/dt$.

The speed di/dt and actual ratio is are applied to a duty ratio table 81 to derive the duty ratio D. The duty ratio D is supplied to the solenoid operated valve 68 through a driver 82.

Further, the output signal $\theta$ of throttle position sensor 74 and the output $N_e$ of engine speed sensor 73 are fed to an engine torque calculator 96, so that engine torque T is calculated based on throttle position $\theta$ and engine speed $N_e$.

On the other hand, the actual transmission ratio i from the calculator 75 is applied to a necessary line pressure table 103 to derive a necessary line pressure $P_{LU}$ per unit torque. The necessary line pressure $P_{LU}$ and the engine torque T are applied to a desired line pressure calculator 104 where a desired line pressure $P_L$ is calculated.

The desired line pressure $P_L$ is applied to a duty ratio table 105 to derive a duty ratio $D_L$ corresponding to the desired line pressure $P_L$. The duty ratio $D_L$ is supplied to a driver 106 which operates the solenoid operated on-off valve 66 at the duty ratio.

In operation, while the vehicle is at a stop, the chamber 10 of the driven pulley 8 is supplied with line pressure through passage 22b, and the chamber 9 of the drive pulley 7 is drained, since $N_P$, $N_S$, and $\theta$ are zero and the duty ratio D is zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the clutch current increases progressively with increase of engine speed. The electromagnetic clutch 2 is gradually engaged, transmitting the engine power to the drive pulley 7. The power of the engine is transmitted to the output shaft 6 at the largest transmission ratio by the driving belt 11 and driven pulley 8, and is further transmitted to axles of the driving wheels 19. Thus, the vehicle is started. When the vehicle speed (output signal $N_s$) exceeds a predetermined value, the clutch 2 is entirely engaged.

At the start of the vehicle, the line pressure is at the highest value by the pressure control valve 40, since the duty ratio for the valve 66 is large, and the spool 42 of the control valve 40 is at the right end position. When the throttle valve is opened for acceleration of the vehicle, the desired transmission ratio id, the desired transmission ratio changing speed did/dt and the transmission ratio changing speed di/dt are calculated at calculators 77, 78, 80. The transmission ratio changing speed di/dt is fed to the duty ratio table 81, so that the duty ratio D for value 68 is obtained from the table 81. The value of the duty ratio D at the acceleration is larger than the neutral value, so that the pressure in the chamber 51d of the control valve 50 is higher than the chamber 51e. Thus, the spool 52 is shifted to the left to communicate the port 51a with the port 51b, so that oil is supplied to the chamber 9 through the conduit 23 to upshift the transmission. When the actual transmission ratio i reaches the desired transmission ratio id, the changing speed di/dt becomes zero, so that the upshifting operation stops.

On the other hand, the duty ratio for the valve 66 is reduced, thereby shifting the spool 42 of the valve 40 to the left. The port 41a communicates with the port 41b of the drain passage 27. Thus, the line pressure reduces, and the transmission is upshifted to the desired transmission ratio id at the speed di/dt.

As the difference between the desired ratio id and the actual ratio i becomes large and the desired transmission ratio changing speed becomes large, the duty ratio for the valve 68 becomes large, thereby increasing the shifting speed of the spool 52 to increase the actual transmission changing speed. When the opening degree of the throttle valve is reduced for deceleration, the duty ratio is reduced, thereby shifting the spool 52 to the right to drain the chamber 9. Thus, the transmission is downshifted. The transmission changing speed at downshifting increases with reduction of the duty ratio.

The control operation of line pressure will be described hereinafter. From the engine torque calculator 96, a torque T is obtained in accordance with throttle position $\theta$ and engine speed $N_e$, which is applied to desired line pressure calculator 104. The calculator calculates a desired line pressure $P_L$. The solenoid operated on-off valve 66 is operated at a duty ratio corresponding to the desired line pressure $P_L$. The line pressure is applied to chamber 10 to hold the belt 11 at a necessary minimum force, the transmitting torque at which is slighty larger than torque T. Thus, power is transmitted through the transmission without the belt slipping.

The transmission ratio control operation dependent on the desired drive pulley speed $N_Pd$ is described hereinafter in more detail. The desired drive pulley speed $N_Pd$ is a function of the actual transmission ratio i and the opening degree $\theta$ of the throttle valve.

$$N_Pd = f_1(i, \theta)$$

The desired transmission ratio id is $$id = N_Pd/N_S = f_1(i, \theta)/N_S$$

Assuming that $\theta$ is constant (for example wide open throttle) and $N_S$ is $N_{SO}$ as shown in FIG. 5a, $$id = f_2(i)/N_{SO}$$

In the conventional system, the desired transmission ratio id is equal to the ido on the actual transmission ratio line shown in FIG. 5a.

Accordingly, the desired transmission ratio of the system according to the present invention is expressed as follows.

$$id = ido + f_3(i)/N_{SO}$$

It will be seen that $f_3(i)$ is a deviation of the drive pulley speed from ido. As shown in FIG. 5b, the deviation increases with increase of the transmission ratio.

The transmission ratio changing speed di/dt is expressed as follows.

$$\begin{aligned} di/dt &= k(id - i) \\ &= k(ido + f_3(i)/N_{SO} - i) \\ &= k(ido - i) + k \cdot f_3(i)/N_{SO} \end{aligned}$$

The first term of the right side of the above equation is the same as the conventional method. In accordance with the present invention, the second term is added to increase the speed. Accordingly, the convergence characteristic is improved as shown in FIG. 5c.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A control system for a continuously variable transmission for transmitting the power of an internal combustion engine to driving wheels of a motor vehicle, having a drive pulley including a hydraulically shiftable disc and a first hydraulic cylinder for shifting the disc, a driven pulley including a hydraulically shiftable disc and a second hydraulic cylinder for operating the disc of the driven pulley, a belt engaged with both pulleys, a transmission ratio control valve having ports and a spool, a first hydraulic circuit having a pump for supplying oil to the second hydraulic cylinder, and to the first hydraulic cylinder through the transmission ratio control valve, the system comprising:
   first detecting means for producing a first speed signal representing input speed of the transmission;
   second detecting means for producing a second speed signal representing output speed of the transmission;
   third detecting means for detecting load on the engine and for producing a load signal;
   first means responsive to the first and second signals for producing an actual transmission ratio signal;
   second means responsive to the load signal and to the actual transmission ratio signal for producing a desired input speed signal;
   third means responsive to the load signal and to the desired input speed signal for producing a desired transmission ratio signal;
   fourth means responsive to the desired transmission ratio signal for shifting the spool of the transmission ratio control valve so as to provide a transmission ratio.

2. The control system according to claim 1 wherein the fourth means includes a second hydraulic circuit for supplying oil to the transmission ratio control valve so as to shift the spool and control valve means provided in the second hydraulic cicuit for controlling the amount of oil supplied to the transmission ratio control valve.

3. The control system according to claim 2 wherein the second hydraulic circuit is provided with a regulator valve for maintaining the pressure of oil at a constant value.

4. The control system according to claim 1 further comprising fifth means responsive to the actual transmission ratio signal and to the desired transmission ratio signal for producing a transmission ratio changing speed signal for operating the fourth means.

* * * * *